(12) United States Patent
Furukawa

(10) Patent No.: US 10,809,729 B2
(45) Date of Patent: Oct. 20, 2020

(54) AUTOMATIC DRIVING CONTROL METHOD, AUTOMATIC DRIVING CONTROL DEVICE USING THE SAME, AND NON-TRANSITORY STORAGE MEDIUM

(71) Applicant: PANASONIC INTELLECTUAL PROPERTY MANAGEMENT CO., LTD., Osaka (JP)

(72) Inventor: Kazuya Furukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 231 days.

(21) Appl. No.: 15/928,659

(22) Filed: Mar. 22, 2018

(65) Prior Publication Data

US 2018/0284791 A1   Oct. 4, 2018

(30) Foreign Application Priority Data

Mar. 31, 2017   (JP) ................. 2017-070221

(51) Int. Cl.
   *G05D 1/02*   (2020.01)
   *G05D 1/00*   (2006.01)

(52) U.S. Cl.
   CPC ......... *G05D 1/0214* (2013.01); *G05D 1/0088* (2013.01); *G05D 2201/0212* (2013.01); *G05D 2201/0213* (2013.01)

(58) Field of Classification Search
   CPC ............... G05D 1/0214; G05D 1/0088; G05D 2201/0212; G05D 2201/0213
   See application file for complete search history.

(56) References Cited

U.S. PATENT DOCUMENTS

| | | | | |
|---|---|---|---|---|
| 9,725,114 B1* | 8/2017 | Brown | ................ | B62D 11/04 |
| 9,836,963 B1* | 12/2017 | Hayward | ............... | B60Q 5/006 |
| 2007/0177011 A1* | 8/2007 | Lewin | ................ | B62D 15/0285 |
| | | | | 348/118 |
| 2008/0296429 A1* | 12/2008 | Edelson | ................ | B64F 1/22 |
| | | | | 244/50 |
| 2009/0261197 A1* | 10/2009 | Cox | ................ | B64C 25/50 |
| | | | | 244/50 |
| 2010/0106356 A1* | 4/2010 | Trepagnier | ............ | G01S 17/023 |
| | | | | 701/25 |

(Continued)

FOREIGN PATENT DOCUMENTS

JP   2011-126446   6/2011

*Primary Examiner* — Behrang Badii
*Assistant Examiner* — Daniel L Greene
(74) *Attorney, Agent, or Firm* — Greenblum & Bernstein, P.L.C.

(57) ABSTRACT

A monitoring unit is configured to monitor a hazardous area and an adjacent area to check whether an obstacle is present. The hazardous area includes a portion, in an intersection, of a host vehicle traveling route of a host vehicle that is to pass through the intersection, and the adjacent area includes an approach portion to the hazardous area of an intersecting vehicle traveling route that intersects with the host vehicle traveling route at the intersection. A determination unit is configured to determine a different control content in accordance with whether the monitoring unit detects presence of an obstacle in the hazardous area or the monitoring unit detects presence of an obstacle in the adjacent area.

15 Claims, 8 Drawing Sheets

(56) References Cited

U.S. PATENT DOCUMENTS

| | | | |
|---|---|---|---|
| 2010/0315217 A1* | 12/2010 | Miura | B60W 30/18009 |
| | | | 340/436 |
| 2015/0375743 A1* | 12/2015 | Izuhara | B60W 30/08 |
| | | | 701/36 |
| 2016/0071418 A1* | 3/2016 | Oshida | B60W 30/165 |
| | | | 701/23 |
| 2016/0231746 A1* | 8/2016 | Hazelton | B60W 30/00 |
| 2017/0019524 A1* | 1/2017 | Kohler | H04M 1/6075 |
| 2017/0123429 A1* | 5/2017 | Levinson | G05D 1/0088 |
| 2018/0136651 A1* | 5/2018 | Levinson | B60W 30/00 |
| 2018/0260635 A1* | 9/2018 | Al-Dahle | B60W 30/095 |

\* cited by examiner

| | HAZARDOUS AREA | ADJACENT AREA |
|---|---|---|
| STATIC OBSTACLE | STOP | IGNORE |
| MOVING OBSTACLE | STOP | ESTIMATE POSSIBILITY OF COLLISION * INCLUDING DETECTION OF DIRECTION INDICATOR |
| UNCLEAR SPOT | GO AT VERY SLOW SPEED | GO AT SLOW SPEED |

AUTOMATIC DRIVING CONTROL METHOD, AUTOMATIC DRIVING CONTROL DEVICE USING THE SAME, AND NON-TRANSITORY STORAGE MEDIUM

The present application claims the benefit of foreign priority of Japanese patent application 2017-070221 filed on Mar. 31, 2017, the contents all of which are incorporated herein by reference.

BACKGROUND

1. Technical Field

The present disclosure relates to an automatic driving control method and an automatic driving control device using the same that are provided for a vehicle, and a non-transitory storage medium.

2. Description of the Related Art

Upon sensing, with a millimeter-wave radar device or the like, an obstacle present on a road in front of a host vehicle, an automatic brake control device actuates brakes of the host vehicle. To reduce a malfunction in or near an intersection, the brakes are controlled in a case where an obstacle is located in or near the intersection.

SUMMARY

The present disclosure provides a technique for executing control in accordance with a shape of an intersection.

An automatic driving control device of an aspect of the present disclosure includes a monitoring unit and a determination unit. The monitoring unit is configured to monitor a hazardous area and an adjacent area to check whether an obstacle is present. The hazardous area includes a portion, in an intersection, of a host vehicle traveling route of a host vehicle that is to pass through the intersection, and the adjacent area includes an approach portion to the hazardous area of an intersecting vehicle traveling route that intersects with the host vehicle traveling route at the intersection. The determination unit is configured to determine a different control content in accordance with whether the monitoring unit detects presence of an obstacle in the hazardous area or the monitoring unit detects presence of an obstacle in the adjacent area.

Another aspect of the present disclosure provides an automatic driving control method. The automatic driving control method includes monitoring a hazardous area and an adjacent area to check whether an obstacle is present. The hazardous area includes a portion, in an intersection, of a host vehicle traveling route of a host, vehicle that is to pass through the intersection, and the adjacent area includes an approach portion to the hazardous area of an intersecting vehicle traveling route that intersects with the host vehicle traveling route at the intersection. The automatic driving control method further includes determining a different control content in accordance with whether presence of an obstacle is detected in the hazardous area or presence of an obstacle is detected in the adjacent area.

Note that any desired combinations of the above-described components and modifications of the features of the present disclosure in devices, systems, methods, programs, recording media containing the programs, vehicles on which the present devices are mounted, or other entities are still effective as other aspects of the present disclosure.

According to the present disclosure, control can be executed in accordance with a shape of an intersection.

DETAILED DESCRIPTION

Prior to describing an exemplary embodiment of the present disclosure, problems found in conventional techniques will be briefly described herein. In a case where brakes are controlled without consideration of the fact that intersections have various shapes, an obstacle that is present in an intersection but does not affect the travel of a host vehicle forces the host vehicle to stop, for example.

Prior to specifically describing the present disclosure, an outline of the present disclosure will be described herein. The present exemplary embodiment relates to an automatic driving control device that controls automatic driving of a vehicle in accordance with whether presence of an obstacle is detected. The automatic driving control device sets a hazardous area and stops a host vehicle, for example, in a case where an obstacle present in the hazardous area is detected by a sensor or the like. Herein, focus will be particularly placed on a case where the host vehicle passes through an intersection. A collision risk is higher at an intersection, and thus, an area including a whole intersection or an area including not only the whole intersection but also a portion adjacent to the intersection is conventionally set as the hazardous area. If the hazardous area is larger, even an obstacle present in a portion that does not affect the travel of the host vehicle tends to force the host vehicle to stop. As a result, smooth passage of the host vehicle is impeded.

To suppress such a situation, the hazardous area is preferably made smaller. However, even in a case where the hazardous area is made smaller, the hazardous area needs to be set such that it is possible to detect an obstacle with which the host vehicle may collide. On the other hand, intersections include an intersection where a plurality of roads intersect with each other and an intersection having a complicated shape such as a round intersection. Furthermore, intersections have various sizes. Therefore, the hazardous area having a shape corresponding to a shape of a road needs to be set. If a configuration in which the shape of the hazardous area is to be predefined and stored for each intersection, it would complicate a rule for creating the hazardous area and would be difficult to keep pace with changes in shape of an intersection caused by, for example, roadworks. Therefore, a hazardous obstacle needs to be detected without impeding smooth passage of the host vehicle through an intersection.

Hereinafter, an exemplary embodiment of the present disclosure will be described in detail with reference to the drawings. Note that each exemplary embodiment described below is only illustrative, and does not limit the present disclosure.

Figure 1:
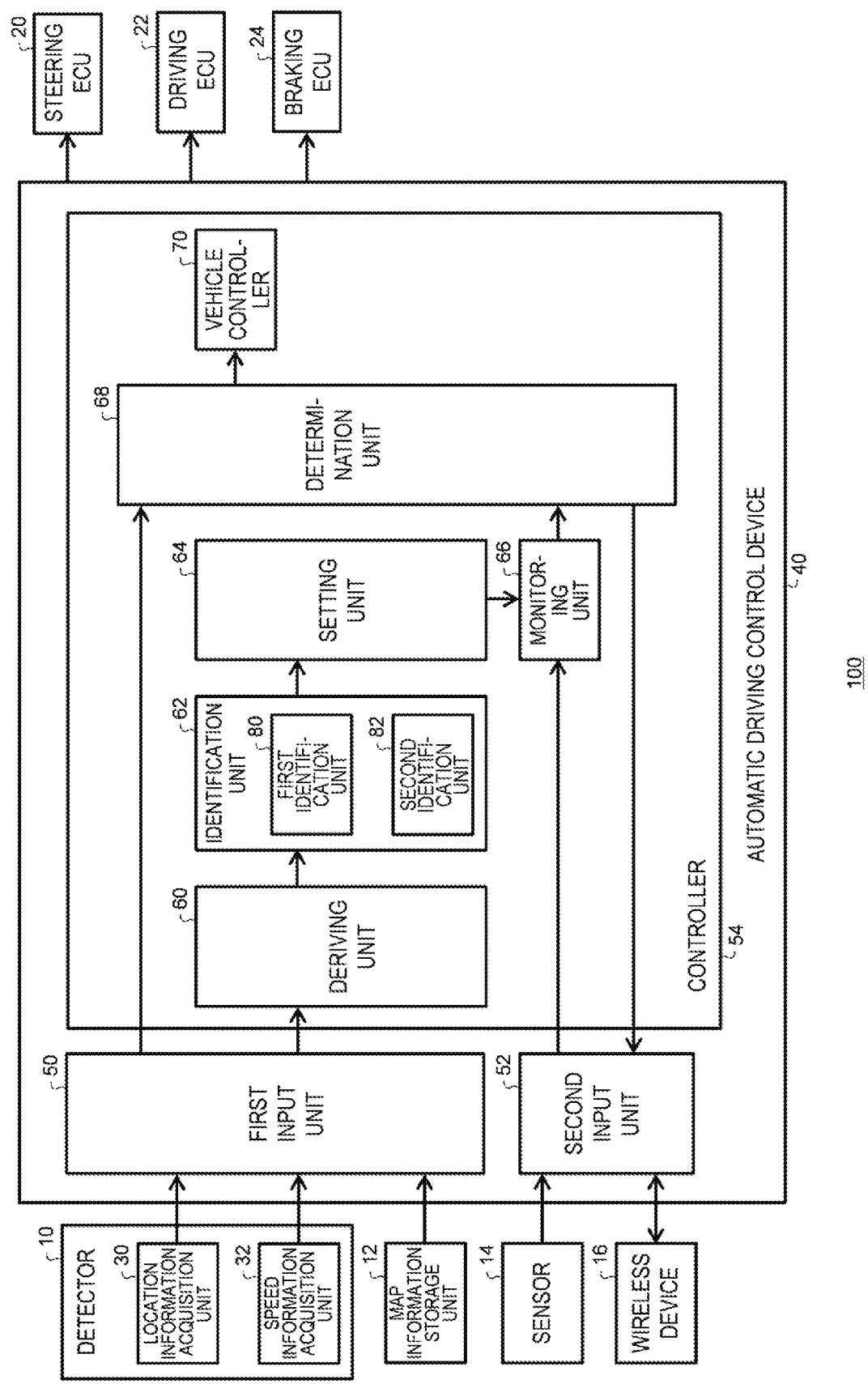
FIG. 1 is a diagram illustrating a configuration of a vehicle according to an exemplary embodiment.

FIG. 1 illustrates a configuration of vehicle 100 according to the exemplary embodiment. Vehicle 100 includes detector 10, map information storage unit 12, sensor 14, wireless device 16, steering electronic control unit (ECU) 20, driving ECU 22, braking ECU 24, and automatic driving control device 40. Detector 10 includes location information acquisition unit 30 and speed information acquisition unit 32. Automatic driving control device 40 includes first input unit 50, second input unit 52, and controller 54. Controller 54 includes deriving unit 60, identification unit 62, setting unit 64, monitoring unit 66, determination unit 68, and vehicle controller 70. Identification unit 62 includes first identification unit 80 and second identification unit 82. The devices illustrated in FIG. 1 may be interconnected by exclusive lines or wire communication such as controller area network (CAN). Alternatively, the devices may be interconnected by wire communication or wireless communication such as a universal serial bus (USB), Ethernet (registered trademark), Wi-Fi (registered trademark), or Bluetooth (registered trademark).

Location information acquisition unit 30 acquires location information on vehicle 100. Location information acquisition unit 30 receives a signal via a global navigation satellite system(s) (GNSS(s)) receiver and acquires, as location information, a current location of vehicle 100 based on the received signal. Furthermore, location information acquisition unit 30 may acquire the location information from a steering angle, a wheel speed pulse, and the like. Note that any publicly known technique is applicable to such location information acquisition, and therefore, description of the location information acquisition will be omitted herein.

Speed information acquisition unit 32 acquires, as speed information, a current speed of vehicle 100 from a vehicle speed sensor. Any publicly known technique is applicable to such speed information acquisition, and therefore, description of the speed information acquisition will be omitted herein. Map information storage unit 12 stores map information. The map information includes road information, and the road information includes information on a plurality of nodes arranged at equal intervals along a road and information on links connecting the nodes adjacent to each other. Such road information represents a location and a shape of an intersection.

First input unit 50 is connected to location information acquisition unit 30, speed information acquisition unit 32, and map information storage unit 12. First input unit 50 receives location information from location information acquisition unit 30, speed information from speed information acquisition unit 32, and map information, particularly road information, from map information storage unit 12. First input unit 50 outputs these pieces of information to controller 54.

Figure 2A:
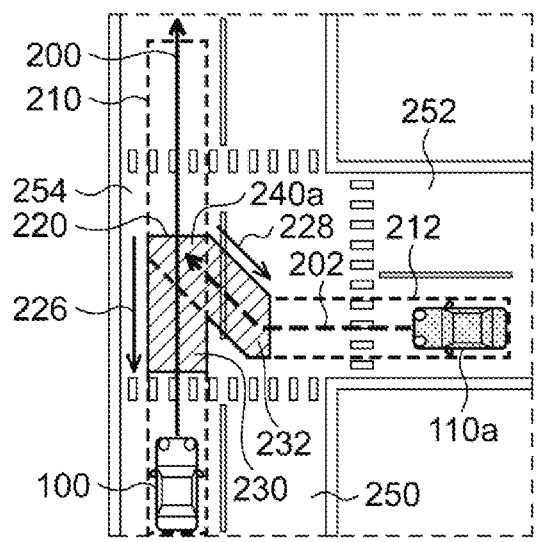
FIG. 2A is a diagram illustrating an outline of a process executed by a controller in FIG. 1.

Upon detecting that vehicle 100 is going to pass through an intersection based on the location information and the road information, deriving unit 60 derives a host vehicle traveling route of vehicle 100 that is going to pass through the intersection. FIGS. 2A to 2D illustrate an outline of a process executed by controller 54. FIG. 2A illustrates a T-junction including first road 250 that extends in a vertical direction and second road 252 that extends in a horizontal direction and intersects with first road 250 at intersection 254. Deriving unit 60 identifies that vehicle 100 travels in an upward lane of first road 250 based on the location information on vehicle 100 and the road information. Based on such identification, deriving unit 60 identifies a traveling direction of vehicle 100, specifically an upward traveling direction, and derives host vehicle traveling route vector 200 extending along the traveling direction. Note that in a case where controller 54 retains a route of vehicle 100 to a destination, deriving unit 60 may acquire the host vehicle traveling route vector 200 from the route.

Figure 2B:
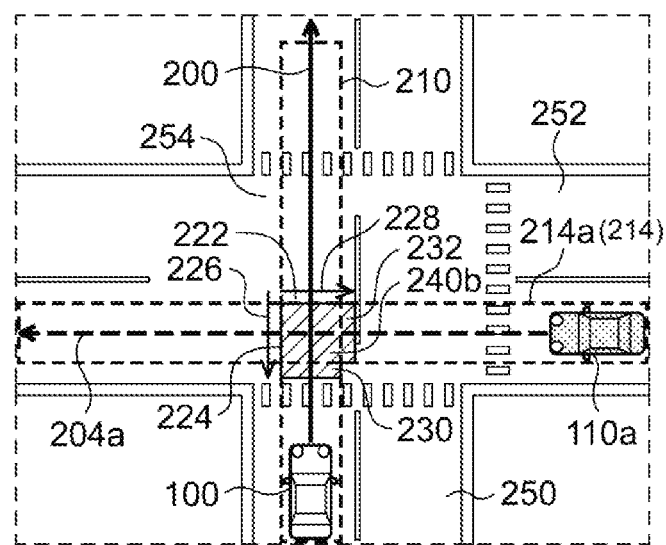
FIG. 2B is a diagram illustrating the outline of the process executed by the controller in FIG. 1.
Figure 2C:
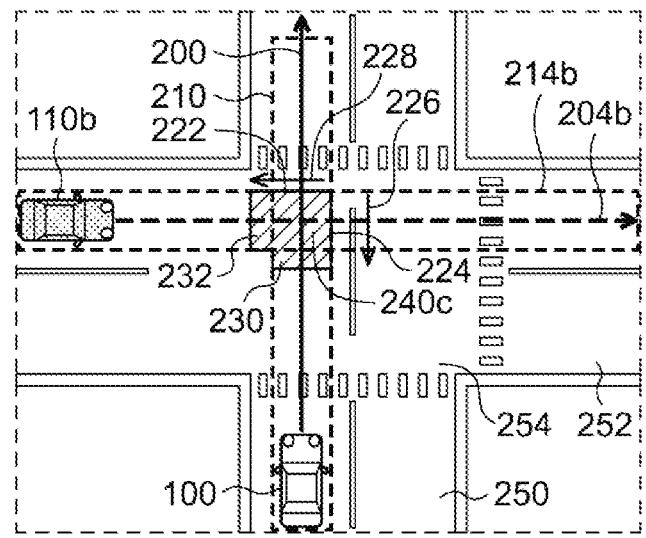
FIG. 2C is a diagram illustrating the outline of the process executed by the controller in FIG. 1.
Figure 2D:
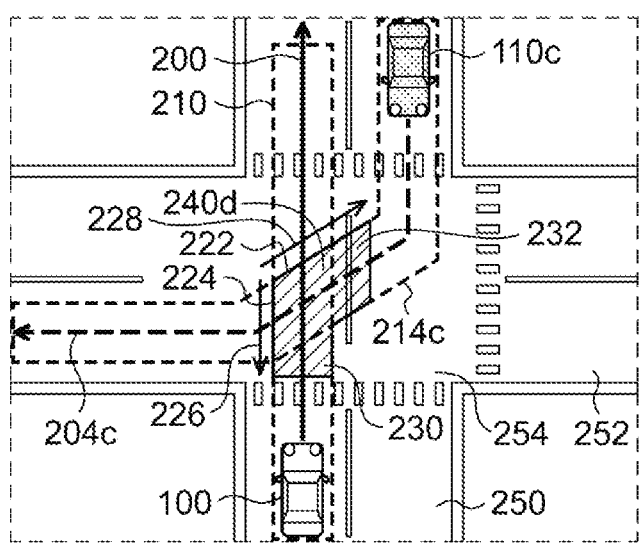
FIG. 2D is a diagram illustrating the outline of the process executed by the controller in FIG. 1.

In these cases, host vehicle traveling route vector 200 is arranged on a center of the lane, and deriving unit 60 derives host vehicle traveling route 210 having a predetermined width with host vehicle traveling route vector 200 serving as a center line. The predetermined width is set equal to, for example, a vehicle width of vehicle 100 or an assumed maximum vehicle width. Host vehicle traveling route 210 corresponds to a route along which vehicle 100 is going to travel. Deriving unit 60 identifies intersection 254 present on host vehicle traveling route 210 and acquires, from the road information, second road 252 that intersects with first road 250 at intersection 254. Vehicle 100 and host vehicle traveling route 210 are similarly illustrated in FIGS. 2B to 2D. Note that each of FIGS. 2B to 2D illustrates a crossroads. Refer back to FIG. 1.

Deriving unit 60 derives, based on information on intersection 254 and the other road identified, a merging vehicle traveling route that merges with host vehicle traveling route 210 at intersection 254. In FIG. 2A, deriving unit 60 acquires, from the road information, information on a lane of second road 252 that is an approach lane to intersection 254 and assumes that first different vehicle 110a is located in the lane. First different vehicle 110a need not really exist. Deriving unit 60 derives merging vehicle traveling route vector 202 that extends from first different vehicle 110a toward intersection 254 and merges with host vehicle traveling route 210 at intersection 254. In this case as well, merging vehicle traveling route vector 202 is arranged on a center of the lane. Deriving unit 60 further derives merging vehicle traveling route 212 having the predetermined width with merging vehicle traveling route vector 202 serving as a center line. Refer back to FIG. 1.

Furthermore, deriving unit 60 derives, based on information on intersection 254 and the other road identified, an intersecting vehicle traveling route that intersects with host vehicle traveling route 210 at intersection 254. In FIG. 2B, deriving unit 60 acquires, from the road information, information on a lane of second road 252 that is an approach lane extending from a right side to intersection 254 and assumes that first different vehicle 110a is located in the lane. Deriving unit 60 derives first intersecting vehicle traveling route vector 204a that extends from first different vehicle 110a toward intersection 254 and keeps straight on so as to intersect with host vehicle traveling route 210 at intersection 254. Deriving unit 60 further derives first intersecting vehicle traveling route 214a having the predetermined width with first intersecting vehicle traveling route vector 204a serving as a center line.

In FIG. 2C, deriving unit 60 acquires, from the road information, information on a lane of second road 252 that is an approach lane extending from a left side to intersection 254 and assumes that second different vehicle 110b is located in the lane. Deriving unit 60 derives second intersecting vehicle traveling route vector 204b that extends from second different vehicle 110b toward intersection 254 and keeps straight on so as to intersect with host vehicle traveling route 210 at intersection 254. Deriving unit 60 further derives second intersecting vehicle traveling route 214b having the predetermined width with second intersecting vehicle traveling route vector 204b serving as a center line.

In FIG. 2D, deriving unit 60 acquires, from the road information, information on a lane of first road 250 that is an approach lane extending from an upper side to intersection 254 and assumes that third different vehicle 110c is located in the lane. Deriving unit 60 derives third intersecting vehicle traveling route vector 204c that extends from third different vehicle 110c toward intersection 254 and turns right at intersection 254 so as to intersect with host vehicle traveling route 210 at intersection 254. Deriving unit 60 further derives third intersecting vehicle traveling route 214c having the predetermined width with third intersecting vehicle traveling route vector 204c serving as a center line. Refer back to FIG. 1.

Identification unit 62 identifies a merging point where host vehicle traveling route 210 and merging vehicle traveling route 212 merge with each other. In FIG. 2A, a portion where host vehicle traveling route 210 and merging vehicle traveling route 212 first meet each other in a traveling direction corresponds to merging point 220. First identification unit 80 identifies a host vehicle intersecting end point where the intersection of host vehicle traveling route 210 with intersecting vehicle traveling route 214 ends, and second identification unit 82 identifies an intersecting vehicle intersecting end point where the intersection of intersecting vehicle traveling route 214 with host vehicle traveling route 210 ends. In FIG. 2B, a portion where the intersection, in the traveling direction, of host vehicle traveling route 210 with first intersecting vehicle traveling route 214a ends is denoted as host vehicle intersecting end point 222. Furthermore, a portion where the intersection, in the traveling direction, of first intersecting vehicle traveling route 214a with host vehicle traveling route 210 ends is denoted as intersecting vehicle intersecting end point 224.

In FIG. 2C, a portion where the intersection, in the traveling direction, of host vehicle traveling route 210 with second intersecting vehicle traveling route 214b ends is denoted as host vehicle intersecting end point 222. Furthermore, a portion where the intersection, in the traveling direction, of second intersecting vehicle traveling route 214b with host vehicle traveling route 210 ends is denoted as intersecting vehicle intersecting end point 224. In FIG. 2D, a portion where the intersection, in the traveling direction, of host vehicle traveling route 210 with third intersecting vehicle traveling route 214c ends is denoted as host vehicle intersecting end point 222. Furthermore, a portion where the intersection, in the traveling direction, of third intersecting vehicle traveling route 214c with host vehicle traveling route 210 ends is denoted as intersecting vehicle intersecting end point 224. Refer back to FIG. 1.

Setting unit 64 derives first area 230 having a predetermined width that returns from merging point 220 in FIG. 2A along host vehicle traveling route 210 by first distance 226. Herein, first distance 226 is derived from multiplication of a speed of vehicle 100 or a speed limit by a predetermine time. Furthermore, setting unit 64 derives second area 232 having a predetermined width that returns from merging point 220 along merging vehicle traveling route 212 by second distance 228. Herein, second distance 228 is derived from multiplication of the speed limit by the predetermine time. Note that first distance 226 and second distance 228 may be defined as a predetermined distance. Setting unit 64 further derives first hazardous area 240a formed of a combination of first area 230 and second area 232.

Setting unit 64 derives first area 230 having a predetermined width that returns from host vehicle intersecting end point 222 in FIG. 2B along host vehicle traveling route 210 by first distance 226. Furthermore, setting unit 64 derives second area 232 having a predetermined width that returns from intersecting vehicle intersecting end point 224 along first intersecting vehicle traveling route 214a by second distance 228. Setting unit 64 further derives second hazardous area 240b formed of a combination of first area 230 and second area 232.

Setting unit 64 derives first area 230 having a predetermined width that returns from host vehicle intersecting end point 222 in FIG. 2C along host vehicle traveling route 210 by first distance 226. Furthermore, setting unit 64 derives second area 232 having a predetermined width that returns from intersecting vehicle intersecting end point 224 along second intersecting vehicle traveling route 214b by second distance 228. Setting unit 64 further derives third hazardous area 240c formed of a combination of first area 230 and second area 232.

Setting unit 64 derives first area 230 having a predetermined width that returns from host vehicle intersecting end point 222 in FIG. 2D along host vehicle traveling route 210 by first distance 226. Furthermore, setting unit 64 derives second area 232 having a predetermined width that returns from intersecting vehicle intersecting end point 224 along third intersecting vehicle traveling route 214c by second distance 228. Setting unit 64 further derives fourth hazardous area 240d formed of a combination of first area 230 and second area 232.

Figure 3:
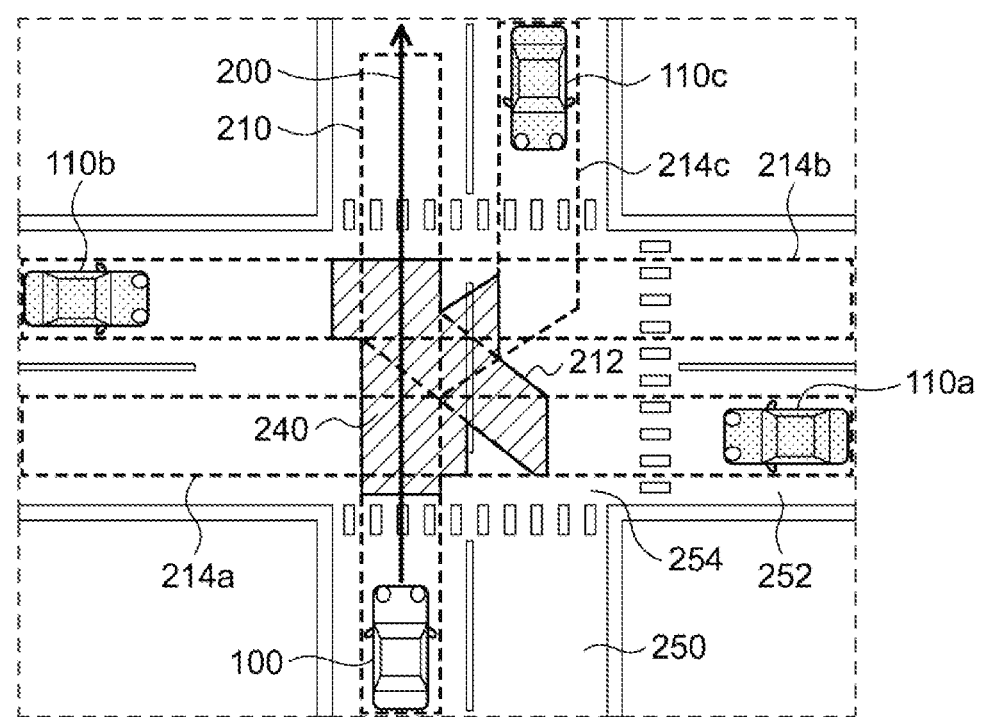
FIG. 3 is a diagram illustrating another outline of the process executed by the controller in FIG. 1.

Subsequently, setting unit 64 derives a hazardous area as is illustrated in FIG. 3. FIG. 3 illustrates another outline of the process executed by controller 54. Setting unit 64 derives final hazardous area 240 by combining first hazardous area 240a to fourth hazardous area 240d. Note that final hazardous area 240 may be derived from a combination of second hazardous area 240b to fourth hazardous area 240d that intersect with host vehicle traveling route 210. Hazardous area 240 can be referred to as an area including a portion, in intersection 254, of host vehicle traveling route 210. Herein, while hazardous area 240 and first hazardous area 240a to fourth hazardous area 240d are set by a combination of a plurality of areas, such a combination may correspond to an area resulting from a logical product or a logical sum of the plurality of areas. Note that, to make the hazardous area smaller, the area resulting from the logical product of the plurality of areas is desirably set as the hazardous area.

Figure 4:
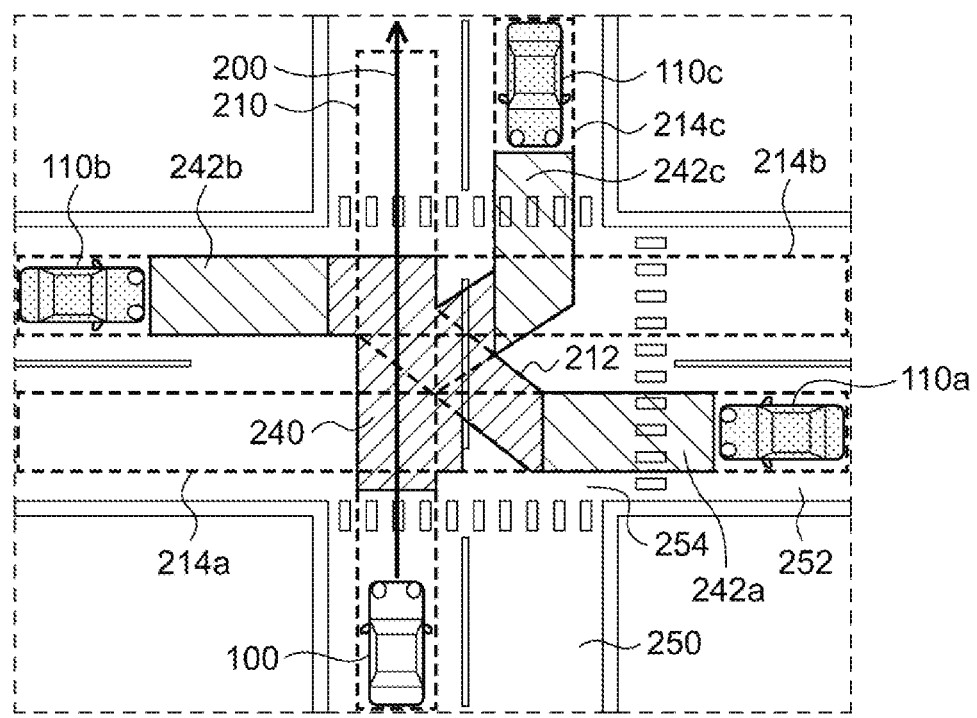
FIG. 4 is a diagram illustrating still another outline of the process executed by the controller in FIG. 1.

Setting unit 64 further derives an adjacent area such that the adjacent area adjoins hazardous area 240. FIG. 4 illustrates still another outline of the process executed by controller 54. Hazardous area 240 is illustrated in the same manner as hazardous area 240 in FIG. 3. First adjacent area 242a is derived to include an approach portion to hazardous area 240, in the traveling direction, of first intersecting vehicle traveling route 214a. The approach portion corresponds to a first end on a side of first adjacent area 242a that is adjacent to hazardous area 240. Furthermore, first adjacent area 242a includes a second end on a side opposite to the first end. The second end can be referred to as a portion of first adjacent area 242a that is furthest from hazardous area 240. Furthermore, second adjacent area 242b is derived to include an approach portion to hazardous area 240, in the traveling direction, of second intersecting vehicle traveling route 214b. Second adjacent area 242b also includes a first end and a second end. Third adjacent area 242c is further derived to include an approach portion to hazardous area 240, in the traveling direction, of third intersecting vehicle traveling route 214c. Third adjacent area 242c also includes a first end and a second end. First adjacent area 242a to third adjacent area 242c are arranged to surround hazardous area 240.

Herein, a length of first adjacent area 242a in a direction along first intersecting vehicle traveling route 214a is derived as follows. Setting unit 64 derives a distance from a point in intersection 254, such as a center of intersection 254, to the location information on vehicle 100. Furthermore, setting unit 64 derives a time required for vehicle 100 to reach the center of intersection 254 (hereinafter referred to as "arrival time") from division of the derived distance by the speed of vehicle 100 or the speed limit. Setting unit 64 further derives the length from multiplication of the arrival time by the speed limit. Furthermore, a length of second adjacent area 242b in a direction along second intersecting vehicle traveling route 214b and a length of third adjacent area 242c in a direction along first road 250 are also derived. Herein, as vehicle 100 travels toward intersection 254, the arrival time decreases. Accordingly, the respective lengths of first intersecting vehicle traveling route 214a to third intersecting vehicle traveling route 214c also decrease. In other words, setting unit 64 makes the second end closer to hazardous area 240 as vehicle 100 approaches intersection 254.

Figures 5, 6:
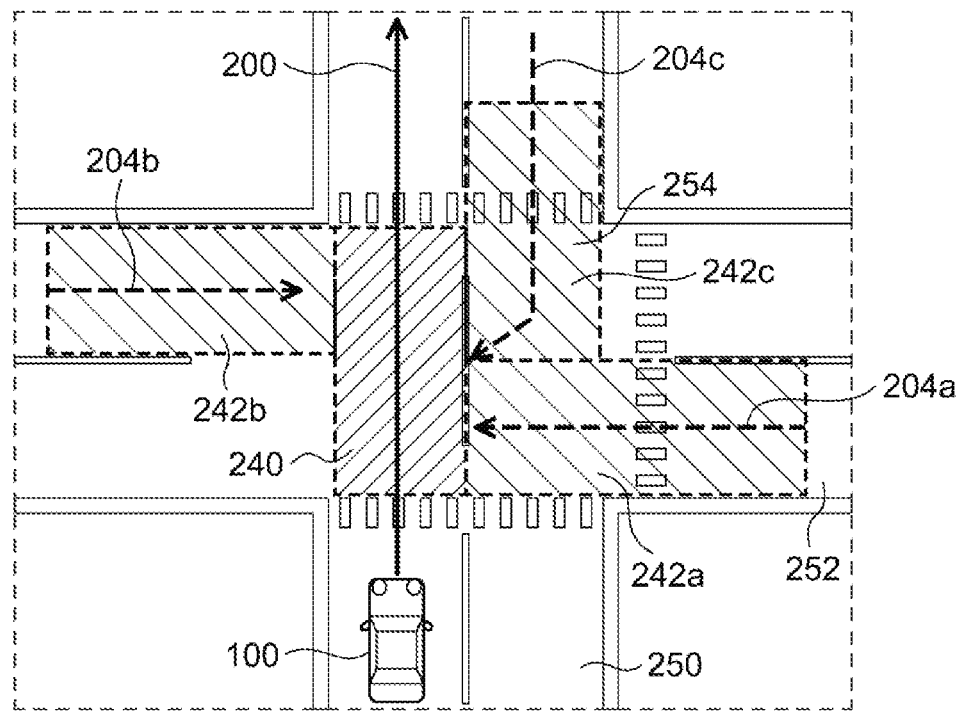
FIG. 5 is a diagram illustrating yet another outline of the process executed by the controller in FIG. 1.
FIG. 6 is a diagram illustrating a data structure of a table stored in a determination unit in FIG. 1.

Setting unit 64 sets hazardous area 240 and first adjacent area 242a to third adjacent area 242c for intersection 254. Note that the respective shapes of hazardous area 240 and first adjacent area 242a to third adjacent area 242c may be simplified to be, for example, rectangular shapes. FIG. 5 illustrates yet another outline of the process executed by controller 54. As illustrated in FIG. 5, setting unit 64 arranges, in intersection 254, hazardous area 240 having a rectangular shape with host vehicle traveling route vector 200 as a center line and arranges first adjacent area 242a to third adjacent area 242c such that first adjacent area 242a to third adjacent area 242c adjoin hazardous area 240. Note that first adjacent area 242a to third adjacent area 242c are collectively referred to as adjacent area 242. Refer back to FIG. 1.

Sensor 14 is a general term for various sensors for detecting an obstacle present outside of vehicle 100. Examples of sensor 14 to be mounted include a camera, a millimeter-wave radar, a light detection and ranging, laser imaging detection and ranging (LIDAR), a sonar, an ambient temperature sensor, an atmospheric pressure sensor, a humidity sensor, and an illuminance sensor. Sensor 14 outputs a detection result to second input unit 52.

Wireless device 16 executes vehicle-to-vehicle communication to transmit and receive a signal to and from wireless device 16 mounted on a different vehicle 100. Furthermore, wireless device 16 may execute road-to-vehicle communication to receive a signal from a roadside unit (not illustrated). Any publicly known technique is applicable to vehicle-to-vehicle communication and road-to-vehicle communication, and therefore, description of vehicle-to-vehicle communication and road-to-vehicle communication will be omitted herein. Furthermore, wireless device 16 may be adapted to a mobile phone communication system, a wireless metropolitan area network (WMAN), or the like and may execute wireless communication with a data server, an infrastructure, a different vehicle, a pedestrian, or the like. Wireless device 16 outputs, to second input unit 52, a reception signal transmitted from wireless device 16 mounted on a different vehicle 100.

Second input unit 52 receives both the detection result from sensor 14 and the reception signal from wireless device 16. The detection result includes information on whether an obstacle is present and, in a case where an obstacle is present, further includes location information on the obstacle. Furthermore, the reception signal includes location information on the different vehicle 100. Hereinafter, an obstacle and a different vehicle 100 may be collectively referred to as "obstacle". Second input unit 52 outputs the detection result and the reception signal to monitoring unit 66.

Monitoring unit 66 monitors hazardous area 240 and adjacent area 242 that have been set by setting unit 64 to check whether an obstacle is present. Specifically, monitoring unit 66 receives the detection result and the reception signal from second input unit 52. In a case where location information on an obstacle is included in the detection result or the reception signal, monitoring unit 66 determines that an obstacle is present. In a case where location information on an obstacle is not included in the detection result or the reception signal, monitoring unit 66 determines that an obstacle is not present.

Upon determining that an obstacle is present, monitoring unit 66 checks whether the location information on the obstacle is for hazardous area 240 or adjacent area 242. In a case where the location information on the obstacle is for hazardous area 240, monitoring unit 66 determines that the obstacle is present in hazardous area 240. In a case where the location information on the obstacle is for adjacent area 242, monitoring unit 66 determines that the obstacle is present in adjacent area 242. Note that, upon detecting a blinking direction indicator in fourth hazardous area 240d or third adjacent area 242c, monitoring unit 66 may determine that an obstacle is present. In a case where the location information on the obstacle is not for hazardous area 240 or adjacent area 242, monitoring unit 66 determines that the obstacle is not present in hazardous area 240 or adjacent area 242.

Upon determining that the obstacle is present in hazardous area 240 or adjacent area 242, monitoring unit 66 further acquires a time variation of the location information on the obstacle and determines that the obstacle is a moving obstacle in a case where the time variation of the location information is greater than a threshold. On the other hand, in a case where the time variation of the location information is equal to or less than the threshold, monitoring unit 66 determines that the obstacle is a static obstacle. Note that, in a case where an unclear spot is present in hazardous area 240 or adjacent area 242, monitoring unit 66 determines that the unclear spot is present.

In other words, monitoring unit 66 recognizes, through monitoring, (1) presence of a static obstacle in hazardous area 240, (2) presence of a static obstacle in adjacent area 242, (3) presence of a moving obstacle in hazardous area 240, (4) presence of a moving obstacle in adjacent area 242, (5) presence of an unclear spot in hazardous area 240, (6) presence of an unclear spot in adjacent area 242, and (7) other cases. Monitoring unit 66 outputs the recognition result to determination unit 68.

Determination unit 68 determines a control content in accordance with a determination result made by monitoring unit 66. Herein, the determination result is compared with a table in FIG. 6, so that the control content is determined. FIG. 6 illustrates a data structure of the table stored in determination unit 68. In a case where presence of a static obstacle is detected in hazardous area 240, determination unit 68 determines to stop vehicle 100. In a case where presence of a static obstacle is detected in adjacent area 242, determination unit 68 determines to ignore the static obstacle. This determination corresponds to a determination of control independent of the static obstacle. In a case where presence of a moving obstacle is detected in hazardous area 240, determination unit 68 determines to stop vehicle 100.

In a case where presence of a moving obstacle is detected in adjacent area 242, determination unit 68 determines control dependent on a possibility of collision with the moving obstacle. Specifically, determination unit 68 acquires a point where vehicle 100 and the obstacle merge or intersect with each other (hereinafter referred to as "intersecting point"). The intersecting point corresponds to a point located between host vehicle intersecting end point 222 and intersecting vehicle intersecting end point 224 or merging point 220. Furthermore, determination unit 68 derives a travel time for vehicle 100 to travel from the current location to the intersecting point (hereinafter referred to as "first travel time") and derives a travel time for the obstacle to travel from the current location to the intersecting point (hereinafter referred to as "second travel time"). In a case where a difference between the first travel time and the second travel time falls within a predetermined range, determination unit 68 determines that the possibility of collision with the moving obstacle is high and thus determines to stop vehicle 100. On the other hand, the difference between the first travel time and the second travel time falls outside the predetermined range, determination unit 68 determines that the possibility of collision with the moving obstacle is low and thus determines to ignore the moving obstacle.

In a case where an unclear spot is present in hazardous area 240, determination unit 68 determines to go at very slow speed. In a case where an unclear spot is present in adjacent area 242, determination unit 68 determines to go at slow speed. Herein, "go at very slow speed" corresponds to travel of vehicle 100 at a speed equal to or less than the first threshold, and "go at slow speed" corresponds to travel of vehicle 100 at a speed equal to or less than the second threshold. Herein, the first threshold is lower than the second threshold. For example, the second threshold is set equal to a half of the speed limit, and the first threshold is set equal to a quarter of the speed limit. As described above, determination unit 68 determines a control content so that different control is executed in accordance with whether monitoring unit 66 detects presence of an obstacle in hazardous area 240 or monitoring unit 66 detects presence of an obstacle in adjacent area 242

Upon determining to stop vehicle 100, determination unit 68 instructs vehicle controller 70 to stop vehicle 100. Furthermore, upon determining vehicle 100 to go at very slow speed or to go at slow speed, determination unit 68 instructs vehicle controller 70 to make vehicle 100 travel at a speed in accordance with the determination. Furthermore, upon determining to ignore the obstacle, determination unit 68 determines a control content for travel based on the location information, the speed information, and the road information from first input unit 50 and the detection result and the reception signal from second input unit 52 and instructs vehicle controller 70 to make vehicle 100 travel in accordance with the determined control content. Any publicly known technique is applicable to such a process, and therefore, description of the process will be omitted herein.

Vehicle controller 70 is an automatic driving controller having an automatic driving control function, and controls steering ECU 20, driving ECU 22, and braking ECU 24 in accordance with the instruction from determination unit 68. Steering ECU 20 is an electronic control unit that executes steering control of vehicle 100, and controls, for example, driving of a motor built in a steering mechanism to steer vehicle 100. Steering ECU 20 executes the steering control in accordance with the instruction from determination unit 68. Driving ECU 22 is an electronic control unit that executes travel driving control of vehicle 100, and controls, for example, driving of a motor or an engine mounted on vehicle 100. Driving ECU 22 executes the driving control in accordance with the instruction from determination unit 68. Braking ECU 24 is an electronic control unit that executes braking control of brakes of vehicle 100, and controls, for example, actuation of a pump or a motor incorporated in a brake hydraulic circuit to control braking. Braking ECU 24 executes the braking control in accordance with the instruction from determination unit 68.

Figure 7:
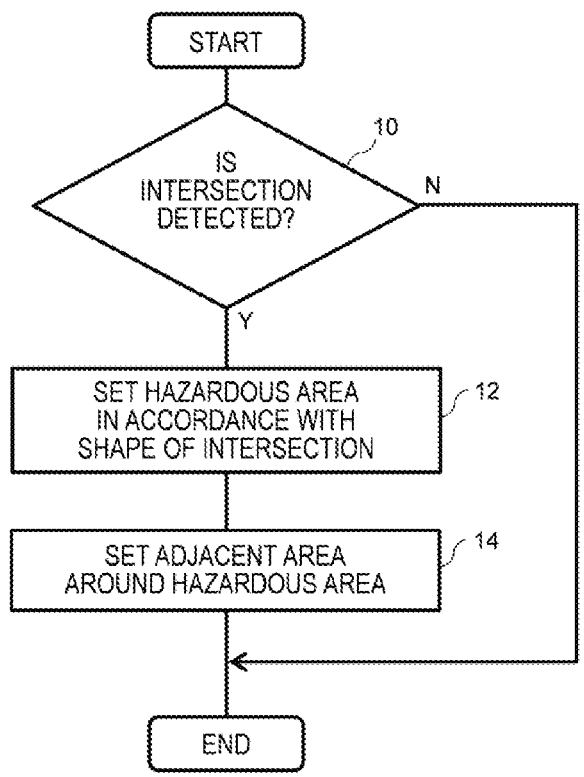
FIG. 7 is a flowchart illustrating a setting procedure executed by an automatic driving control device in FIG. 1.

An operation of automatic driving control device 40 configured as described above will be described. FIG. 7 is a flowchart illustrating a setting procedure executed by automatic driving control device 40. In a case where intersection 254 is detected by deriving unit 60 (Y in S10), setting unit 64 sets hazardous area 240 in accordance with a shape of intersection 254 (S12) and sets adjacent area 242 around hazardous area 240 (S14). In a case where intersection 254 is not detected by deriving unit 60 (N in S10), step 12 and step 14 are skipped.

Figure 8:
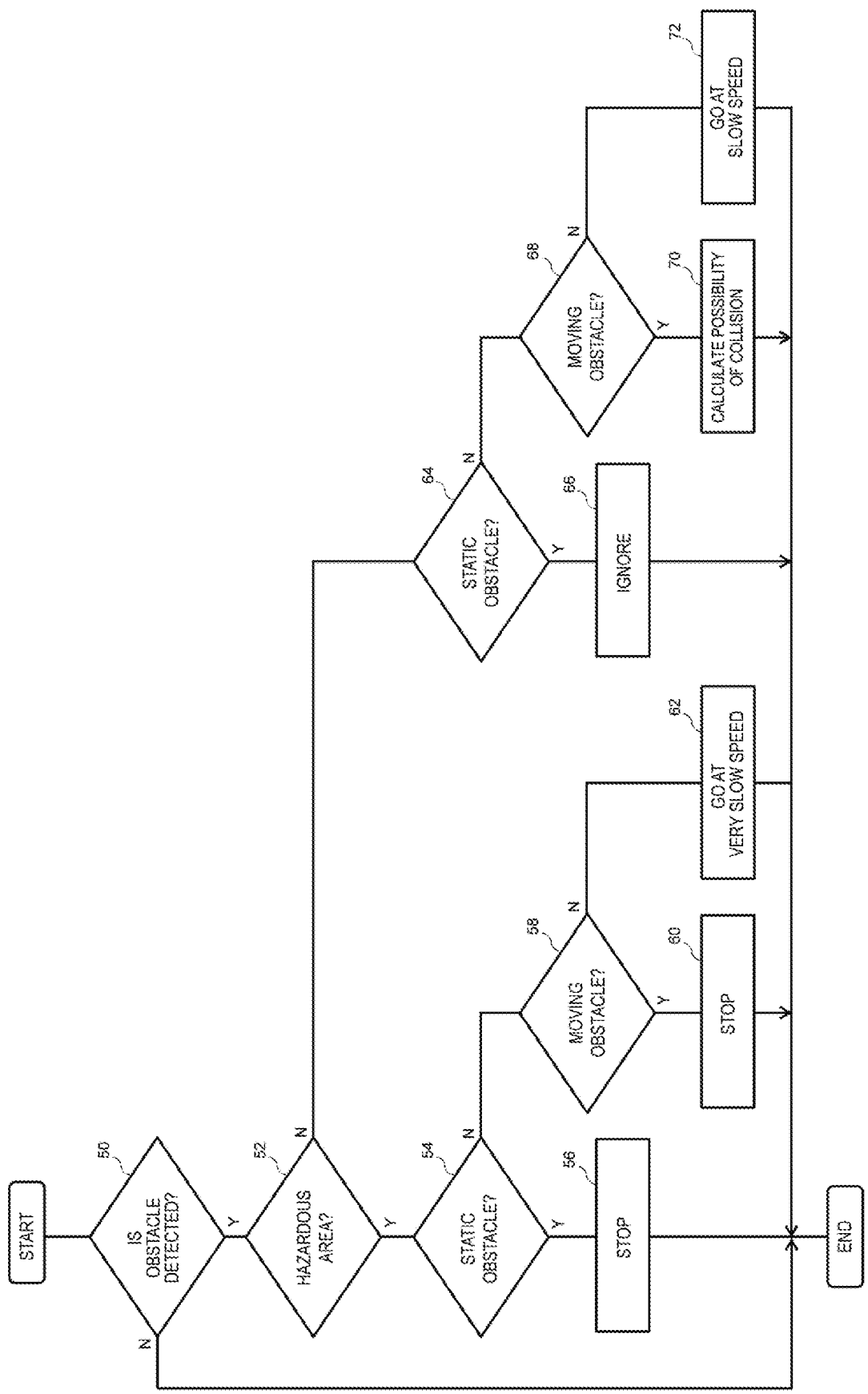
FIG. 8 is a flowchart illustrating a procedure of a process executed by the automatic driving control device in FIG. 1.

FIG. 8 is a flowchart illustrating a procedure of a process executed by automatic driving control device 40. In a case where an obstacle is detected by monitoring unit 66 (Y in S50), the obstacle is present in hazardous area 240 (Y in S52), and the obstacle is a static obstacle (Y in S54), determination unit 68 determines to stop vehicle 100 (S56). Note that the case where an obstacle is detected also includes a case where an unclear spot is present. In a case where the obstacle is not a static obstacle (N in S54) and the obstacle is a moving obstacle (Y in S58), determination unit 68 determines to stop vehicle 100 (S60). In a case where the obstacle is not a moving obstacle (N in S58), that is, an unclear spot is present, determination unit 68 determines to go at very slow speed (S62). In a case where the obstacle is not located in hazardous area 240 (N in S52) and the obstacle is a static obstacle (Y in S64), determination unit 68 determines to ignore the obstacle (S66). In a case where the obstacle is not a static obstacle (N in S64) and the obstacle is a moving obstacle (Y in S68), determination unit 68 calculates a possibility of collision (S70). In a case where the obstacle is not a moving obstacle (N in S68), that is, an unclear spot is present, determination unit 68 determines to go at slow speed (S72). In a case where no obstacle is detected by monitoring unit 66 (N in S50), the process is terminated.

According to the present exemplary embodiment, the hazardous area formed of the combination of the area that returns from the merging point along the host vehicle traveling route by the predetermined distance and the area that returns from the merging point along the merging vehicle traveling route by the predetermined distance is set, thus making it possible to form the hazardous area in accordance with a rule independent of a shape of an intersection. Furthermore, the hazardous area formed of the combination of the area having the predetermined width that returns from the host vehicle intersecting end point along the host vehicle traveling route by the predetermined distance and the area having the predetermined width that returns from the intersecting vehicle intersecting end point along the intersecting vehicle traveling route by the predetermined distance is set, thus making it possible to form the hazardous area in accordance with the rule independent of a shape of an intersection. Furthermore, the hazardous area is formed in accordance with the rule independent of a shape of an intersection, thus making it possible to set the hazardous area in accordance with a shape of an intersection even in a case where the shape of the hazardous area is not stored for each intersection.

Furthermore, the hazardous area is derived for each of the plurality of intersecting vehicle traveling routes, and the final hazardous area including the hazardous areas is set, thus making it possible to form the hazardous area irrespective of a number of roads that intersect with each other at an intersection. Furthermore, the hazardous area is formed irrespective of the number of roads that intersect with each other at an intersection, thus making it possible to set the hazardous area adapted to intersections with various shapes. Furthermore, the hazardous area for the intersecting vehicle traveling route and the hazardous area for the merging vehicle traveling route are combined with each other, thus making it possible to set the hazardous area adapted to intersections with various shapes. Furthermore, the hazardous area has a limited size, thus making it possible to suppress occurrence of a situation where a vehicle that need not stop is forced to stop.

Furthermore, a different control content is determined for each of the hazardous area and the adjacent area that, have been set at separate locations in an intersection, thus making it possible to execute control suitable for the hazardous area and the adjacent area. Furthermore, the hazardous area and the adjacent area are set for each intersection, thus making it possible to execute, for each intersection, control suitable for the hazardous area and the adjacent area. Furthermore, control suitable for the hazardous area and the adjacent area is executed for each intersection, thus making it possible to execute control in accordance with a shape of an intersection. Furthermore, a different control content is determined for each of the hazardous area and the adjacent area that have been set at separate locations in an intersection, thus making it possible to consider influence of an obstacle with which a vehicle may collide while suppressing occurrence of a situation where a vehicle that need not stop is forced to stop.

Furthermore, a size of the adjacent area is adjusted in accordance with a distance from the host vehicle to the intersection, thus making it possible to prevent the adjacent area from becoming excessively large. Furthermore, a determination to stop the host vehicle is made when a static obstacle is detected in the hazardous area, and a determination of control independent of a static obstacle is made when the static obstacle is detected in the adjacent area, thus making it possible to execute a process suitable for a static obstacle. Furthermore, a determination to stop the host vehicle is made when a moving obstacle is detected in the hazardous area, and a determination of control dependent on a possibility of collision is made when a moving obstacle is detected in the adjacent area, thus making it possible to execute a process suitable for a moving obstacle. Furthermore, a speed is changed in accordance with whether an unclear spot is present in the hazardous area or in the adjacent area, thus making it possible to make the host vehicle travel in accordance with a level of risk.

While the exemplary embodiment according to the present disclosure has been described above with reference to the drawings, all or some of the functions of the above-described devices and processing units can be implemented by a computer program. A computer causing the above-described functions to be implemented by the program includes an input device, an output device, a central processing unit (CPU), a storage device, a reading device, a network card, and the like. Such components are interconnected via a bus. Examples of the input device include a keyboard, a mouse, and a touch pad. Examples of the output device include a display and a speaker. Examples of the storage device include a read only memory (ROM), a random access memory (RAM), a hard disk drive, and a solid state drive (SSD). The reading device reads information from a recording medium such as a digital versatile disk read only memory (DVD-ROM) or a USB memory. The network card executes communication over a network. The reading device reads, from the recording medium, the program recorded on the recording medium, and the program is stored in the storage device. Alternatively, the network card executes communication with a server device connected to the network, and a program, downloaded from the server device, for implementing the respective functions of the above-described devices is stored in the storage device. Furthermore, the CPU copies the program stored in the storage device onto the RAM, sequentially fetches instructions included in the program from the RAM, and executes each of the instructions, thus implementing the respective functions of the above-described devices. Furthermore, as an obstacle, a different road user may be added. For example, a motorcycle (two-wheeled vehicle) and a bicycle (on which a person rides) may be regarded as different vehicles, and a person pushing a bicycle and a person on a skateboard may be regarded as pedestrians.

Furthermore, all or some of the functions of the above-described devices and processing units can be implemented as a physical circuit such as a dedicated integrated circuit (IC) or a large-scale integration (LSI) circuit.

An aspect of the present disclosure is summarized below.
(Item 1-1)

An automatic driving control device monitors a hazardous area to check whether an obstacle is present. The automatic driving control device includes an identification unit and a setting unit. The identification unit identifies a merging point where a host vehicle traveling route of a host vehicle that is to pass through an intersection and a merging vehicle traveling route merge with each other at the intersection. The setting unit sets a hazardous area formed of a combination of an area having a predetermined width that returns from the merging point identified by the identification unit along the host vehicle traveling route by a predetermined distance and an area having a predetermined width that returns from the merging point identified by the identification unit along the merging vehicle traveling route by the predetermined distance.

According to this aspect, the hazardous area formed of the combination of the area that returns from the merging point along the host vehicle traveling route by the predetermined distance and the area that returns from the merging point along the merging vehicle traveling route by the predetermined distance is set, thus making it possible to set the hazardous area in accordance with a shape of an intersection.
(Item 1-2)

An automatic driving control device monitors a hazardous area to check whether an obstacle is present. The automatic driving control device includes a first identification unit, a second identification unit, and a setting unit. The first identification unit identifies a host vehicle intersecting end point where an intersection of a host vehicle traveling route of a host vehicle that is to pass through an intersection with an intersecting vehicle traveling route at the intersection ends. The second identification unit identifies an intersecting vehicle intersecting end point where an intersection of the intersecting vehicle traveling route with the host vehicle traveling route ends. The setting unit sets a hazardous area formed of a combination of an area having a predetermined width that returns from the host vehicle intersecting end point identified by the first identification unit along the host vehicle traveling route by a predetermined distance and an area having a predetermined width that returns from the intersecting vehicle intersecting end point identified by the second identification unit along the intersecting vehicle traveling route by the predetermined distance.

According to this aspect, the hazardous area formed of the combination of the area that returns from the host vehicle intersecting end point along the host vehicle traveling route by the predetermined distance and the area that returns from the intersecting vehicle intersecting end point along the intersecting vehicle traveling route by the predetermined distance is set, thus making it possible to set the hazardous area in accordance with a shape of an intersection.

(Item 1-3)

In the automatic driving control device described in Item 1-2, the setting unit derives another hazardous area between the host vehicle traveling route and an additional intersecting vehicle traveling route that intersects with the host vehicle traveling route at the intersection and sets a final hazardous area including the derived hazardous area.

In this case, the hazardous area is derived for each of the plurality of intersecting vehicle traveling routes, and the final hazardous area including the hazardous areas is set, thus making it possible to set the hazardous area adapted to intersections with various shapes.

(Item 1-4)

In the automatic driving control device described in Item 1-2 or 1-3, the setting unit derives a hazardous area formed of a combination of an area having a predetermined width that returns from a merging point where the host vehicle traveling route and a merging vehicle traveling route merge with each other at the intersection along the host vehicle traveling route by the predetermined distance and an area having a predetermined width that returns from the merging point along the merging vehicle traveling route by the predetermined distance. Furthermore, the setting unit sets a final hazardous area including the derived hazardous area.

In this case, a hazardous area for the intersecting vehicle traveling route and a hazardous area for the merging vehicle traveling route are combined with each other, thus making it possible to set the hazardous adapted to intersections with various shapes.

(Item 1-5)

An automatic driving control method is used for monitoring a hazardous area to check whether an obstacle is present. The automatic driving control method includes identifying a merging point where a host vehicle traveling route of a host vehicle that is to pass through an intersection and a merging vehicle traveling route merge with each other at the intersection. Furthermore, the automatic driving control method includes setting a hazardous area formed of a combination of an area having a predetermined width that returns from the identified merging point along the host vehicle traveling route by a predetermined distance and an area having a predetermined width that returns from the identified merging point along the merging vehicle traveling route by the predetermined distance.

(Item 1-6)

An automatic driving control method is used for monitoring a hazardous area to check whether an obstacle is present. The automatic driving control method includes identifying a host vehicle intersecting end point where an intersection of a host vehicle traveling route of a host vehicle that is to pass through an intersection with an intersecting vehicle traveling route at the intersection ends. Furthermore, the automatic driving control method includes identifying an intersecting vehicle intersecting end point where an intersection of the intersecting vehicle traveling route with the host vehicle traveling route ends. The automatic driving control method further includes setting a hazardous area formed of a combination of an area having a predetermined width that returns from the identified host vehicle intersecting end point along the host vehicle traveling route by a predetermined distance and an area having a predetermined width that returns from the identified intersecting vehicle intersecting end point along the intersecting vehicle traveling route by the predetermined distance.

(Item 1-7)

A non-transitory storage medium contains a program for monitoring a hazardous area to check whether an obstacle is present. The program causes a computer to execute identifying a merging point where a host vehicle traveling route of a host vehicle that is to pass through an intersection and a merging vehicle traveling route merge with each other at the intersection. Furthermore, the program causes a computer to execute setting a hazardous area formed of a combination of an area having a predetermined width that returns from the identified merging point along the host vehicle traveling route by a predetermined distance and an area having a predetermined width that returns from the identified merging point along the merging vehicle traveling route by the predetermined distance.

(Item 1-8)

A non-transitory storage medium contains a program for monitoring a hazardous area to check whether an obstacle is present, the program being executed by a computer. The program causes the computer to execute identifying a host vehicle intersecting end point where an intersection of a host vehicle traveling route of a host vehicle that is to pass through an intersection with an intersecting vehicle traveling route at the intersection ends. Furthermore, the program causes the computer to execute identifying an intersecting vehicle intersecting end point where an intersection of the intersecting vehicle traveling route with the host vehicle traveling route ends. The program further causes the computer to execute setting a hazardous area formed of a combination of an area having a predetermined width that returns from the identified host vehicle intersecting end point along the host vehicle traveling route by a predetermined distance and an area having a predetermined width that returns from the identified intersecting vehicle intersecting end point along the intersecting vehicle traveling route by the predetermined distance.

(Item 2-1)

An automatic driving control device includes a monitoring unit and a determination unit. The monitoring unit monitors a hazardous area and an adjacent area to check whether an obstacle is present. The hazardous area includes a portion, in an intersection, of a host vehicle traveling route of a host vehicle that is to pass through the intersection, and the adjacent area includes an approach portion to the hazardous area of an intersecting vehicle traveling route that intersects with the host vehicle traveling route at the intersection. The determination unit determines a different control content in accordance with whether the monitoring unit detects presence of an obstacle in the hazardous area or the monitoring unit detects presence of an obstacle in the adjacent area.

According to this aspect, a different control content is determined for each of the hazardous area and the adjacent area that have been set at separate locations in an intersection, thus making it possible to execute control in accordance with a shape of an intersection.

(Item 2-2)

In the automatic driving control device described in Item 2-1, the adjacent area has a first end adjacent to the hazardous area and a second end on a side opposite to the first end, and the second end is made closer to the hazardous area as the host vehicle approaches the intersection.

In this case, a size of the adjacent area is adjusted in accordance with a distance from the host vehicle to the intersection, thus making it possible to prevent the adjacent area from becoming excessively large.

(Item 2-3)

In the automatic driving control device described in Item 2-1 or 2-2, in a case where presence of a static obstacle is detected in the hazardous area, the determination unit determines to stop the host vehicle, and in a case where presence of a static obstacle is detected in the adjacent area, the determination unit determines control independent of the static obstacle.

In this case, a determination to stop the host vehicle is made when a static obstacle is detected in the hazardous area, and a determination of control independent of a static obstacle is made when the static obstacle is detected in the adjacent area, thus making it possible to execute a process suitable for a static obstacle.

(Item 2-4)

In the automatic driving control device described in any one of Items 2-1 to 2-3, in a case where presence of a moving obstacle is detected in the hazardous area, the determination unit determines to stop the host vehicle, and in a case where presence of a moving obstacle is detected in the adjacent area, the determination unit determines control dependent on a possibility of collision with the moving obstacle.

In this case, a determination to stop the host vehicle is made when a moving obstacle is detected in the hazardous area, and a determination of control dependent on a possibility of collision is made when a moving obstacle is detected in the adjacent area, thus making it possible to execute a process suitable for a moving obstacle.

(Item 2-5)

In the automatic driving control device described in any one of Items 2-1 to 2-4, in a case where an unclear spot is present in the hazardous area, the determination unit determines to make the host vehicle travel at a speed equal to or less than a first threshold, and in a case where an unclear spot is present in the adjacent area, the determination unit determines to make the host vehicle travel at a speed equal to or less than a second threshold. The first threshold is lower than the second threshold.

In this case, a speed is changed in accordance with whether an unclear spot is present in the hazardous area or in the adjacent area, thus making it possible to make the host vehicle travel in accordance with a level of risk.

(Item 2-6)

The automatic driving control method includes monitoring a hazardous area and an adjacent area to check whether an obstacle is present. The hazardous area includes a portion, in an intersection, of a host vehicle traveling route of a host vehicle that is to pass through the intersection, and the adjacent area includes an approach portion to the hazardous area of an intersecting vehicle traveling route that intersects with the host vehicle traveling route at the intersection. The automatic driving control method also includes determining a different control content in accordance with whether presence of an obstacle is detected in the hazardous area or presence of an obstacle is detected in the adjacent area.

(Item 2-7)

A non-transitory storage medium contains a program to be executed by a computer. The program causes the computer to execute monitoring a hazardous area and an adjacent area to check whether an obstacle is present. The hazardous area includes a portion, in an intersection, of a host vehicle traveling route of a host, vehicle that is to pass through the intersection, and the adjacent area includes an approach portion to the hazardous area of an intersecting vehicle traveling route that intersects with the host vehicle traveling route at the intersection. The program also causes the computer to execute determining a different control content in accordance with whether presence of an obstacle is detected in the hazardous area or presence of an obstacle is detected in the adjacent area.

The present disclosure has been described above according to the exemplary embodiment. It will be understood by those skilled in the art that the exemplary embodiment is merely an example, other exemplary modifications in which components and processes of the exemplary embodiment are variously combined are possible, and the other exemplary modifications still fall within the scope of the present disclosure.

In the present exemplary embodiment, description has been given of a case where vehicle 100 travels on a left side of a road. However, the present disclosure is not limited to the exemplary embodiment, and, for example, a case where vehicle 100 travels on a right side of a road may be employed. This exemplary modification allows the range of application to be widened.

In the present exemplary embodiment, as the shape of intersection 254, a T-junction and a crossroads are employed as examples. However, the present disclosure is not limited to the exemplary embodiment, and, for example, the shape of intersection 254 is not limited to the above-described shapes. A rotary intersection such as a roundabout, a three-way junction, or the like may be employed, and the present disclosure is applicable to intersections with such various shapes. This exemplary modification allows the range of application to be widened.

The present disclosure allows control to be executed in accordance with a shape of an intersection and is thus useful for an automatic driving control method, an automatic driving control device using the same, and the like.

What is claimed is:

1. An autonomous driving control device for a vehicle, the autonomous driving control device comprising:
   an input circuit configured to be coupled to a sensor, the sensor being located in the vehicle;
   an output circuit configured to be coupled to at least one of a steering electronic control unit of the vehicle, a driving electronic control unit of the vehicle, and a braking electronic control unit of the vehicle, wherein the sensor monitors a hazardous area and an adjacent area to check whether an obstacle is present, the hazardous area including a part of an intersection, the adjacent area being adjacent to the hazardous area, the hazardous area to be traveled through by the vehicle in the intersection, the adjacent area not to be traveled through by the vehicle, the hazardous area having a first width with a first vehicle traveling route vector, and the adjacent area having a second width with a second vehicle traveling route vector, and the output circuit outputs instructions to the at least one of the steering electronic control unit, the driving electronic control unit, and the braking electronic control unit, in accordance with presence of the obstacle in the hazardous area and the adjacent area.

2. The autonomous driving control device according to claim 1, wherein the adjacent area has a first end adjacent to the hazardous area and a second end on a side opposite to the first end, and the second end is made closer to the first end the vehicle approaches the intersection.

3. The autonomous driving control device according to claim 1, wherein when a presence of a static obstacle is detected in the hazardous area, the output circuit outputs an instruction to stop the vehicle, and when a presence of a static obstacle is detected in the adjacent area, the output circuit outputs an instruction independent of the static obstacle in the adjacent area.

4. The autonomous driving control device according to claim 1, wherein when a presence of a moving obstacle is detected in the hazardous area, the output circuit outputs an instruction to stop the vehicle, and when a presence of a moving obstacle is detected in the adjacent area, the output circuit outputs an instruction dependent on a possibility of collision with the moving obstacle in the adjacent area.

5. The autonomous driving control device according to claim 1, wherein when an unclear spot is present in the hazardous area, the output circuit outputs an instruction to make the vehicle travel at a speed equal to or less than a first threshold, when an unclear spot is present in the adjacent area, the output circuit outputs an instruction to make the vehicle travel at a speed equal to or less than a second threshold, and the first threshold is lower than the second threshold.

6. The autonomous driving control device according to claim 1, wherein the hazardous area and the adjacent area are to be traveled through by another vehicle.

7. The autonomous driving c device according to claim 1, further comprising a control circuit, wherein the control circuit causes:

the output circuit to output instructions to the at least one of the steering electronic control unit, the driving electronic control unit, and the braking electronic control unit, in accordance with the presence of the obstacle in the hazardous area and the adjacent area.

8. An autonomous driving control method, comprising:

monitoring, by a sensor located in a vehicle, a hazardous area and an adjacent area to check whether an obstacle is present, the hazardous area including a part of an intersection, the adjacent area being adjacent to the hazardous area, the hazardous area to be traveled through by the vehicle in the intersection, the adjacent area not to be traveled through by the vehicle, the hazardous area having a first width with a first vehicle traveling route vector, the adjacent area having a second width with a second vehicle traveling route vector, and outputting, via an output circuit, instructions to the at least one of a steering electronic control unit of the vehicle, a driving electronic control unit of the vehicle, and a braking electronic control unit of the vehicle, in accordance with presence of the obstacle in the hazardous area and the adjacent area.

9. The autonomous driving control method according to claim 8, wherein the adjacent area has a first end adjacent to the hazardous area and a second end on a side opposite to the first end, and the second end is made closer to the first end as the vehicle approaches the intersection.

10. The autonomous driving control method according to claim 8, wherein when a presence of a static obstacle is detected in the hazardous area, outputting an instruction to stop the vehicle, and when a presence of a static obstacle is detected in the adjacent area, outputting an instruction independent of the static obstacle in the adjacent area.

11. The autonomous driving control method according to claim 8, wherein when a presence of a moving obstacle is detected in the hazardous area, outputting an instruction to stop the vehicle, and when a presence of a moving obstacle is detected in the adjacent area, outputting an instruction dependent on a possibility of collision with the moving obstacle in the adjacent area.

12. The autonomous driving control method according to claim 8, wherein when an unclear spot is present in the hazardous area, outputting an instruction to make the vehicle travel at a speed equal to or less than a first threshold, when an unclearspot is present in the adjacent area, outputting an instruction to make the vehicle travel at a speed equal to or less than a second threshold, and the first threshold being lower than the second threshold.

13. The autonomous driving control method according to claim 8, the hazardous are and the adjacent area are to be traveled through by another vehicle.

14. The autonomous driving control method according to claim 8, controlling to output instructions to the at least one of the steering electronic control unit; the driving electronic control unit, and the braking electronic control unit, in accordance with the presence of the obstacle in the hazardous area and the adjacent area.

15. An autonomous driving control device for a vehicle, the autonomous driving control device comprising:

an input means for being coupled to a sensor, the sensor being located in the vehicle;

an output means for being coupled to at least one of a steering electronic control unit of the vehicle, a driving electronic control unit of the vehicle, and a braking electronic control unit of the vehicle, wherein the sensor monitors a hazardous area and an adjacent area to check whether an obstacle is present, the hazardous area including a part of an intersection, the adjacent area being adjacent to the hazardous area, the hazardous area to be traveled through by the vehicle in the intersection, the adjacent area not to be traveled through by the vehicle, the hazardous area having a first width with a first vehicle traveling route vector, the adjacent area having a second width with a second vehicle traveling route vector, and the output means outputs instructions to the at least one of the steering electronic control unit, the driving electronic control unit, and the braking electronic control unit; in accordance with presence of the obstacle in the hazardous area and the adjacent area.

\* \* \* \* \*